(12) United States Patent
Niemela

(10) Patent No.: US 10,050,977 B2
(45) Date of Patent: Aug. 14, 2018

(54) PREVENTING MISUSE OF CODE SIGNING CERTIFICATES

(71) Applicant: F-Secure Corporation, Helsinki (FI)

(72) Inventor: Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 136 days.

(21) Appl. No.: 15/000,162

(22) Filed: Jan. 19, 2016

(65) Prior Publication Data
US 2016/0212104 A1    Jul. 21, 2016

(51) Int. Cl.
*H04L 29/06*        (2006.01)
*G06F 8/60*         (2018.01)

(52) U.S. Cl.
CPC .............. *H04L 63/123* (2013.01); *G06F 8/60* (2013.01); *H04L 63/1408* (2013.01); *H04L 63/0823* (2013.01)

(58) Field of Classification Search
CPC ............... H04L 63/123; H04L 63/1048; H04L 63/0823; G06F 8/60
See application file for complete search history.

(56) References Cited

U.S. PATENT DOCUMENTS

| | | | | |
|---|---|---|---|---|
| 6,526,508 B2* | 2/2003 | Akins, III | ............... | H04L 63/04 348/E5.004 |
| 6,901,512 B2* | 5/2005 | Kurn | ...................... | H04L 9/083 380/277 |
| 8,818,897 B1* | 8/2014 | Slodki | .................. | G06F 21/121 705/51 |
| 2003/0051169 A1 | 3/2003 | Sprigg et al. | ................. | 713/201 |
| 2005/0125668 A1 | 6/2005 | Botz | ............................ | 713/171 |
| 2011/0010699 A1* | 1/2011 | Cooper | ................... | G06F 21/12 717/169 |
| 2013/0205362 A1* | 8/2013 | Kiehtreiber | ............. | G06F 21/51 726/1 |
| 2013/0305352 A1* | 11/2013 | Narendra | .............. | H04M 1/673 726/19 |
| 2014/0366143 A1 | 12/2014 | Sandler | ......................... | 726/25 |

FOREIGN PATENT DOCUMENTS

WO    WO 99/30217    6/1999

OTHER PUBLICATIONS

"Introduction to Code Signing", © 2016 Microsoft, 5 pgs.

* cited by examiner

*Primary Examiner* — Ghodrat Jamshidi
(74) *Attorney, Agent, or Firm* — Harrington & Smith

(57) ABSTRACT

A method of authenticating or controlling a software application on an end user device. The method includes, at the end user device, downloading software application data from a remote server, the data including application code, a cryptographically derived signature obtained using said application code, and an identity of an application developer. The identity is then used as a look-up key to obtain or authenticate a public key of the application data, and to obtain one or more associated installation and/or operation conditions. The cryptographically derived signature is authenticated using said application code and said public key, and, in the event that authentication is successful, authentication of the application code is performed and/or installation and/or operation of the application controlled using said conditions.

17 Claims, 2 Drawing Sheets

PREVENTING MISUSE OF CODE SIGNING CERTIFICATES

TECHNICAL FIELD

The present invention relates to preventing the misuse of code signing certificates that are used to allow authentication of the source of code.

BACKGROUND

The recent massive growth in the availability and use of software applications, commonly referred to as "apps", particularly for smartphones, tablets, and other portable, wireless devices, has provided an opportunity for criminals and others with malicious intent. Apparently trustworthy apps may be used to install malware onto user devices. In order to protect against such threats, operating system vendors such as Google™, Apple™ and Microsoft™ generally implement a certificate based authentication mechanism in their operating systems. In order for its apps to work with a given operating system, an app developer must first obtain a code signing certificate form the operating system vendor. Such a certificate may be, for example, a private key of a public-private key pair according to the RSA public key cipher algorithm.

According to one such approach, the code forming the app, or possibly an abbreviated hash of that code, is encrypted by the app developer using its private key to generate a signature. The signature may also be taken over identity data such as the developer's name. The plain text code, signature, and optionally the developer's public key and claimed identity, are then distributed to end user devices. The operating system on the device typically comprises an app installer which uses the signature to authenticate the code. If the developer's public key is not provided by the developer, the app installer first obtains the developer's public from the operating system vendor (or its agent) using the developer's claimed identity. If the public key is provided by the developer, the authenticity of the public key may be confirmed by performing a check with the operating system vendor. The app installer generates a hash of the code if required. It decrypts the received signature using the developer's public key, and compares the result with the code or hash. If the two match, then the app installer assumes that the app is validly provided by the approved developer and continues with the installation process. If not, then installation is stopped and, if required, an alert generated.

Additional authentication mechanisms may be employed to increase security. For example, Apple™ apply a further signature to apps available on their app store. Apple only apply this signature after they have themselves verified the identity of the app developer and confirmed the proper operation of the app. However, such an approach is not appropriate for all operating system vendors, particularly where a more flexible app distribution approach is desirable.

A further use of certificates is to minimise the load on client device antivirus (AV) scanners. Scanning a particular app using signature and heuristic scanning engines to detect malware can be relatively computationally intensive. An AV scanner may therefore maintain a database of trusted sources and their respective public keys (or links to those keys). When an app to be scanned is identified as being accompanied by a certificate, before commencing an intensive scan, the AV engine will first check if the certificate is associated with a trusted source. If so, then a detailed scan may not be considered necessary. Of course, the use of certificates to minimise AV scanning requirements may be applicable not just to apps, but to files in general. Such a "whitelisting" approach to AV scanning is extremely useful in order to reduce computational load and improve device performance.

In the absence of an additional security mechanism such as that employed by Apple™, the conventional approaches (to both AV scanning and app installation) are only secure if app developers prevent their code signing certificates from falling into the hands of attackers. Furthermore, the conventional approaches cannot by itself protect against rogue developers who validly obtain a code signing certificate.

SUMMARY

It is an object of the present invention to enhance the conventional code signing certificate based authentication mechanisms in order to reduce the risk of attack. This object is achieved by configuring a security application such as an AV scanner, or app installer, to make the code signing certificate based authentication conditional upon one or more additional conditions.

According to a first aspect of the present invention there is provided a method of authenticating or controlling a software application on an end user device. The method comprises:

1) downloading software application data from a remote server to the end user device, the data including application code, a cryptographically derived signature obtained using said application code, and an identity of an application developer;
2) using said identity as a look-up key to obtain or authenticate a public key of the application data, and to obtain one or more associated installation and/or operation conditions;
3) authenticating said cryptographically derived signature using said application code and said public key; and
4) in the event that authentication is successful, performing authentication of the application code and/or controlling installation and/or operation of the application using said conditions.

In the event that authentication of said cryptographically derived signature is unsuccessful, installation of the software application may be prevented.

Steps 2) to 4) may be performed by an antivirus service. In the event that authentication of the application code using said conditions is unsuccessful, the antivirus service may perform an antivirus scan of the application code using one or both of a signature based scan or a heuristic based scan and, in the event that authentication of the application code using said conditions is successful, no such antivirus scan is performed.

The antivirus service may detect downloading of the software application data and performs steps 2) to 4) prior to installation of the application on the end user device, the antivirus service preventing installation of the application if one of the authentication steps fails.

The antivirus service may detect downloading of the software application data and performs steps 2) to 4) prior to installation of the application on the end user device, the antivirus service controlling installation and/or operation of the application in accordance with one or more of said conditions.

The antivirus service may employ an antivirus client installed on said end user device, the antivirus client performing steps 2) to 4). Alternatively, steps 2) and 3) may be performed by a remote server or server cloud.

Steps 2) to 4) may be performed by an application installer associated with a local operating system of the end user device. Said application installer may be a component of a local operating system of the end user device.

Step 2) may comprise sending a query containing said identity or said public key, or a digest thereof, to a remote server, and receiving from the remote server a response containing the public key or an authentication of the public key.

Step 2) may comprise performing a lookup on a local database of the end user device.

The conditions may comprise one or more of:
a specification of one or more allowed filenames or filename ranges;
a specification of one or more allowed file installation locations;
a specification of one or more operating behaviours;
a specification of one or more user community prevalence thresholds or patterns.

According to a second aspect of the invention there is provided a method of scanning an application downloaded to an end user device for malware. The method comprises maintaining a whitelist identifying authenticated certificates and respective authentication conditions, determining that the application has been signed with one of said authenticated certificates, and determining whether or not code of the application satisfies the associated condition(s) and, if yes, then flagging the application as trusted and, if no, then performing a further antivirus scan of the application.

Steps 1) to 3) may be performed by an antivirus client installed on the end user device, optionally in cooperation with an antivirus support service provided by a remote server or server cloud. Alternatively, steps 1) and 2) may be performed by a remote server or server cloud, and optionally said step of determining whether or not code of the application satisfies the associated condition(s) is also performed by the remote server or server cloud or by a further remote server or server cloud.

According to a third aspect of the present invention there is provided a non-transitory computer storage medium having stored thereon computer program code for implementing the method of the above first or second aspect of the invention.

According to a fourth aspect of the invention there is provided apparatus for authenticating or controlling a software application on an end user device, the apparatus comprising processor circuitry and a storage unit for storing instructions executable by the processor circuitry. The apparatus is operative to:
1) download software application data from a remote server to the end user device, the data including application code, a cryptographically derived signature obtained using said application code, and an identity of an application developer;
2) use said identity as a look-up key to obtain or authenticate a public key of the application data, and obtain one or more associated installation and/or operation conditions;
3) authenticate said cryptographically derived signature using said application code and said public key; and
4) in the event that authentication is successful, perform authentication of the application code and/or control installation and/or operation of the application using said conditions.

According to a fifth aspect of the invention there is provided apparatus for authenticating or controlling a software application on an end user device. The apparatus comprises processor circuitry and a storage unit for storing instructions executable by the processor circuitry, whereby the apparatus is operative to:
1) maintain a whitelist identifying authenticated certificates and respective authentication conditions;
2) determine that the application has been signed with one of said authenticated certificates; and
3) determine whether or not code of the application satisfies the associated condition(s) and, if yes, then flagging the application as trusted and, if no, then performing a further antivirus scan of the application.

According to a sixth aspect of the invention there is provided an end user device comprising the apparatus of the fourth or fifth aspect of the present invention.

DETAILED DESCRIPTION

As discussed above, code signing certificate based authentication mechanisms are commonly used to allow end users, or rather their devices, to authenticate the source of a downloaded app or other file. For a general discussion of these mechanisms the user is referred, for example, to the web page titled "Introduction to Code Signing" available for download from the Microsoft development centre: http://msdn.microsoft.com/en-us/library/ie/ms537361(v=vs.85).aspx.

In the following discussion it is assumed that this or a similar method forms the basis of the authentication process implemented by some local application or task, such as an app installer of an operating system (OS) or antivirus (AV) scanner. In addition, the local application or task applies one or more conditions when determining whether or not to trust a file or files being installed or run on the device.

Figure 1:
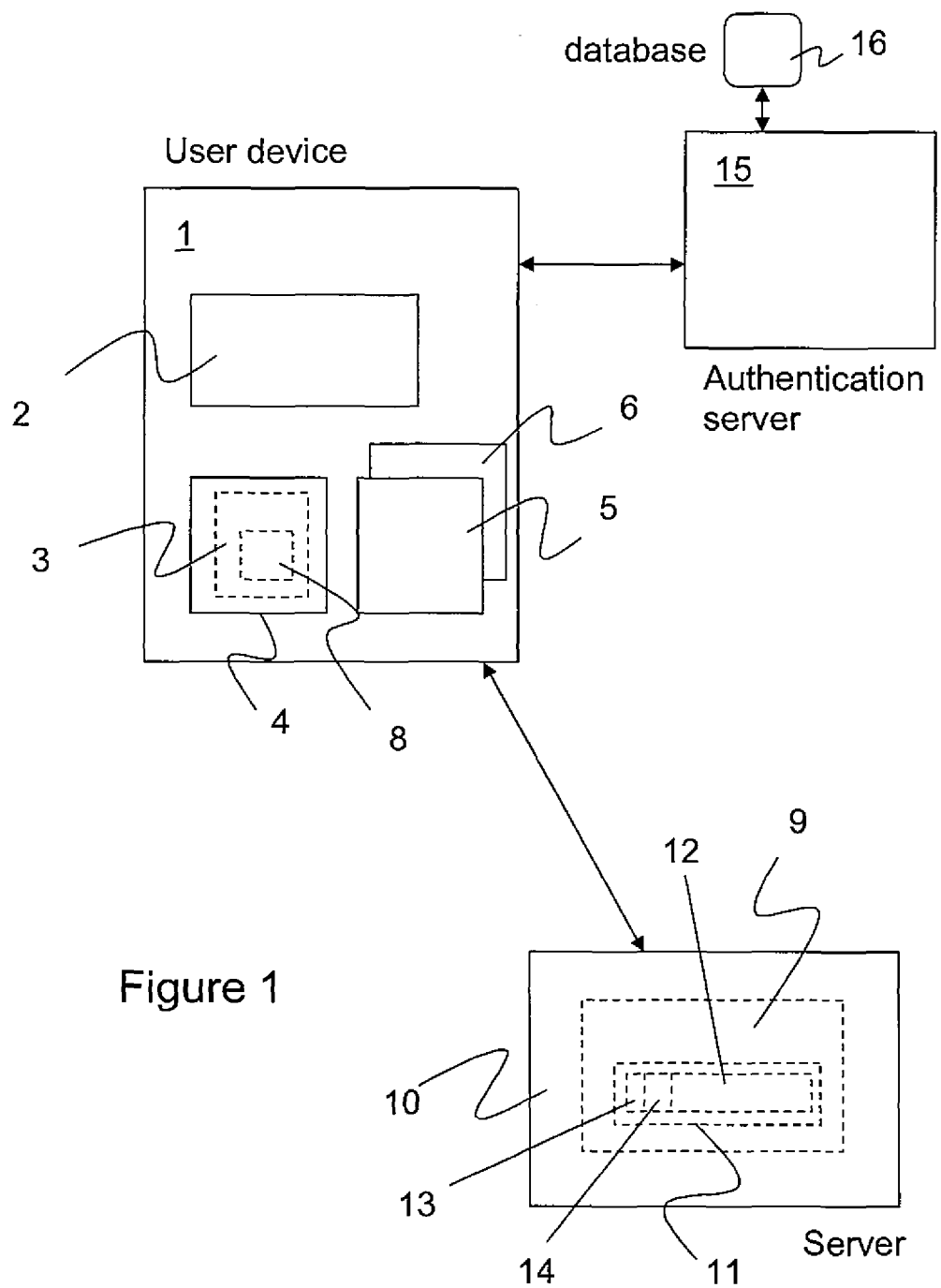
FIG. 1 illustrates schematically a system architecture for applying a condition based authentication of apps at an end user device.

FIG. 1 illustrates schematically a system architecture employing this approach in the context of an app installer. A smartphone, tablet or other end user device 1 comprises a graphical user interface (GUI) 2. Code 3 for implementing an operating system (OS) is installed in a device memory 4, and is run by a processor 5 and other memories 6. The OS may be, for example, Android™, iOS™, or Windows Mobile™. The OS code comprises code for implementing an app installer 8. Typically, the app installer 8 is initiated when a user selects, via the GUI 2, to download and install an app. The user typically does this by first accessing an app store 9. In the case of a device implementing Android, one such app store is Google Play™. The app store is hosted by a server or server cluster/cloud 10. An app developer publishes its app on the app store. One such app 11 is illustrated in FIG. 1.

The app 11 comprises app code 12. In the case of Android, this code includes an "APK." file (Android Application Package). In addition, the app comprises a signature 13 generated using, for example, a conventional code signing certificate based authentication mechanism. The signature may be obtained by applying a private key of the app developer to a hash of the APK file (and possibly additional data). The identity 14 of the app developer is appended to the signature 13 in plain text.

The act of selecting to download the app 11 causes the app installer 8 to be initiated. The installer downloads the app 11 from the app store and saves this temporarily in some device memory.

The OS vendor, or some trusted third party, maintains an authentication server 15, or server cluster/cloud, that has access to a developer public key and condition database 16. Keys and conditions are mapped in the database to respective developer identities. The app installer 8 on the end user device 1 is able to query the database 16, via the authentication server 15, using as lookup key the app developer identity 14 that is appended to the app signature 13. In response to such a query, the authentication server returns the public key to which the app developer's identity 14 is mapped (assuming that such a mapping exists in the database), together with the associated conditions. This query and response procedure is secured by some appropriate mechanism agreed between the authentication server 15 and the end user device 1 (e.g. using an RSA public key cipher algorithm where the public key of the authentication server 15 is securely pre-installed in the end user device). Since the conditions are intended to protect against the case where a developers private key is compromised, the conditions may be secured by some other appropriate mechanism (e.g. digitally signed using a private key other than that of the developer, such as a private key of the authentication server).

Upon receipt of the response, the app installer 8 performs a first level authentication of the downloaded app code 11 using the public key. This may involve generating a hash of the APK file, applying the public key to decrypt the signature, and comparing the result to the locally derived hash. If the decrypted signature and the hash match, then this provides an initial indication that the app is authentic. However, as discussed above, this by itself does not protect against malware that has been signed with an authentic, but stolen code signing certificate, or malware that has been generated by a rogue developer that has previously obtained a valid code signing certificate. To add a further line of defense, the app installer 8 makes use of the conditions provided in the response from the authentication server. These conditions set limits on the installation behaviour, operation, or possibly other features of the app. Some possible conditions and their implementation will now be described:

Limiting Trust of Code Signing Certificate Only for Certain Package Names

The security of the authentication procedure may be improved by limiting a certificate to only a specified list of package names, or using some regular expression to match the package names. For example, a certificate may have a condition associated with it that specifies that the certificate is trusted only if it is used to sign applications with package name matching "com.f-secure.*", where "*" indicates a wildcard. Upon receiving the condition from the authentication server 15, the app installer 8 check the package name of the downloaded app against the name(s) specified in the condition. Installation is blocked if there is no match.

Limiting Trust of Code Signing Certificate Only for a Certain Set of Permissions Typically, a malicious app signed with a given certificate requires a much broader set of permissions than a clean app requires, in order to implement malicious functionality, for example the ability to send Short Messaging Service (SMS) messages in the case that the user device is a smartphone. Thus, a set of OS permissions for which the certificate is trusted can be specified; any app that seeks permissions outside the specified permissions list will not be treated as trusted even if it is signed with a trusted certificate. This way trust can be assigned for a limited set of permissions with only a very light investigation, with a more in-depth investigation for cases which require a broader level of trust. Typically, permissions for an app are defined inside the manifest file (e.g. for the APK package) during compilation. These permissions cannot be changed once the application has been compiled and signed. If an app requests a permission that is not provided for by the associated certificate, a request may be sent to some back end server for a more detailed, e.g. manual, analysis of the app.

Limiting Trust by Prevalence of the Signed Binary

Usually apps provided by major app stores such as Google Play and iTunes have a very high prevalence amongst the user community, and this prevalence builds up quickly after initial launch of an app. Certificates associated with such vendors may have a condition that specifies that they are trusted only when applied to apps which have a high prevalence, i.e. a prevalence exceeding some specified threshold. When the app installer 8 receives a response to its query from the authentication server 15, the condition acts as a prompt for the app installer to send a query to a further server (not shown) which is responsible for tracking the prevalence of files. The server counts the number of queries received, and returns the current count in response to a query. If the count exceeds the prevalence threshold for the app, the app is installed, otherwise it is not installed.

This prevalence based approach may be enhanced by identifying patterns in the installation prevalence. With the launch of a new app, the prevalence server will likely see a brief spike of related queries, allowing it to build up information on how popular and widespread the app is. If the pattern matches a typical pattern from that vendor, the signature can be trusted while, if the prevalence is very low, the app would be considered suspicious.

Limiting Trust by Installation Information

Apps may have very consistent installation activity and location patterns for files that are characteristic of the app developers. For example, Windows system components are all installed by the Trusted Installer process, while Google Windows binaries are either installed by Chrome installer or updater. Also the filenames and locations usually follow set patterns. Thus, a certificate for such a vendor may be trusted only when the signed app follows a given pattern of installation behavior. In other words, an app may be trusted only when it is installed in a location or locations where it is expected to be installed. This could be used for example for digital signatures used for drivers; a signature associated with a driver is trusted only if the file is to be installed into "c:\Windows\System32\drivers\". If the file is to be installed in some other location, the signature is not trusted.

Limiting Trust by Binary Structure

Tracking installation behavior is feasible for major app developers, but can be a daunting task when considering smaller but still trustworthy developers. In these cases the trust attached to a certificate can be made conditional on the developer's typical development practices and binary structure. For example, a condition may be dependent upon one or more of; debug information or compiler vendor (for example trust requires that app files are built with Microsoft Visual C++ compiler), certain preset library imports, and certain strings in the application binary. These features are relatively static for a given developer, but would be unlikely to be replicated by a malware author. Most malware is packed or otherwise obfuscated, which means that the compiler cannot be identified, and thus would immediately differ significantly from clean software signed with the same certificate.

Whilst an attacker may be able to construct malware that satisfies the conditions associated with the (trusted) developer's identity, such malware will inevitably be limited in what it can do. Moreover, to satisfy trust conditions, the attacker must be aware of these conditions and that is likely to be difficult to achieve.

The approach described above is equally applicable to AV scanning that makes use of code signing certificate based authentication mechanisms in order to identify whitelisted apps and files for which AV scanning is unnecessary. A typical approach involves an AV vendor creating whitelists of trusted certificates and maintaining these on a database accessible via a back end authentication server. AV scanning clients are installed on end user devices. When a client determines a need to scan a file or files, e.g. belonging to an app downloaded onto the end user device, the client first identifies a signature included within the app code, and an identity of the app developer. The client queries the database via the back end authentication server in order to obtain the developer's public key and an associated set of conditions (assuming these are available; if these are not available, the app may by default be identified as untrusted and either "rejected" or scanned). The client uses the public key to authenticate the signature. The conditions may be secured by some appropriate mechanism other than the developers private key, e.g. digitally signed using a private key other than that of the developer, such as a private key of the AV vendor.

If authentication is successful and the downloaded conditions relate to further authentication of the app, the AV client will perform a further inspection of the app code before fully authenticating the app. For example, as discussed above, the client may only fully authenticate the app if the file name(s) conform to some specified naming format, the app installs itself in expected locations, and/or the app requires only expected conditions. If the app fails any of these tests, either the app is rejected as suspect, or a further, full AV scan is performed.

In the event that downloaded conditions define a limited set of permissions that an authenticated app may be allowed, the AV client may cooperate with the local OS to ensure that the app is installed only with these permissions. Thus, for example, if a certificate is not associated with a permission to send SMS messages, the AV client may cause inhibit the setting of any such permission by the app installer.

Figure 2:
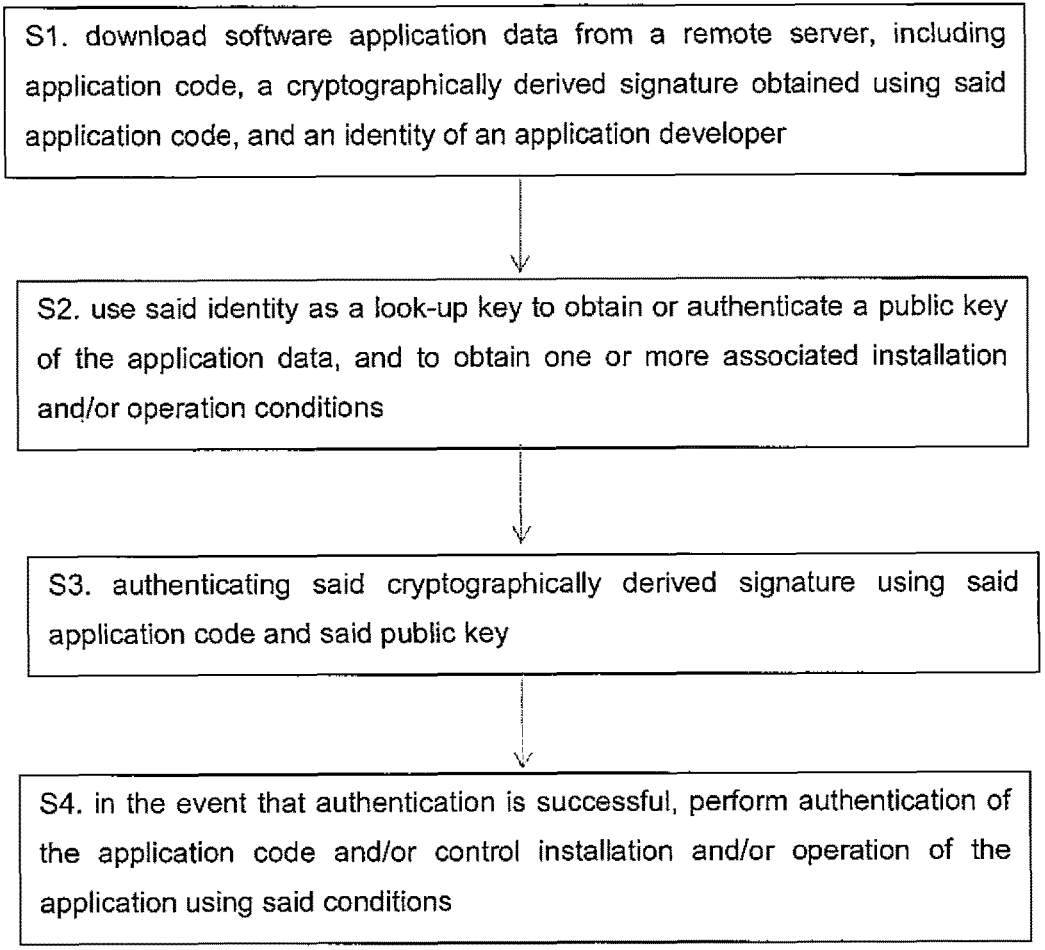
FIG. 2 is a flow diagram illustrating at a high level a condition based app authentication procedure.

FIG. 2 is a flow diagram illustrating the operation of an end user device in accordance with the approach described above. At step S1 an end user device commences downloading of software application data from a remote server, e.g. a server hosting Google Play. This data includes application code, a cryptographically derived signature obtained using said application code, and an identity of an application developer. At step S2 the end user device uses the developers identity as a look-up key to obtain or authenticate a public key of the application data, and to obtain one or more associated installation and/or operation conditions. It does this by sending a query to a back end authentication server. Upon receipt of the response, at step S3 the device authenticates the cryptographically derived signature using the application code and the public key. At step S4, in the event that authentication is successful, the device performs authentication of the application code and/or controls installation and/or operation of the application using the specified conditions.

It will be appreciated that various modifications may be made to the above described embodiments without departing from the scope of the invention. For example, whilst the approach described above relies upon a remote lookup operation to provide the public key and conditions associated with an app developer to the end user device, this data may be stored locally in the device as a local certificate trust database (which is periodically updated via downloads from a back end server). In a further alternative approach, the public key may be downloaded with the app, and verified with a remote or local lookup operation.

In a further alternative embodiment, various tasks described above as being performed by the end user device may be delegated to a remote server or server cloud. For example, relevant app data may be passed from the end user device to a server, with the server performing authentication of the signature and possibly authenticating based upon the associated conditions, before notifying the end user device whether or not installation can continue (and under what conditions).

The invention claimed is:

1. A method of authenticating or controlling a software application on an end user device, the method comprising steps of:
   1) downloading software application data 'from a first remote server to the' end user device, the data' including application code, a cryptographically derived signature obtained using said application code, and an identity of an application developer;
   2) detecting downloading of the software application data and using this detection as a trigger to use said identity as a look-up key to obtain or authenticate a public key of the application data, and to obtain one or more associated installation conditions from a second remote server;
   3) authenticating said cryptographically derived signature using said application code and said public key;
   4) in the event that authentication is successful, performing a further authentication of the application code using said conditions; and
   5) in the event that one of the authentications fails, preventing installation of the application, and in the event that both authentications are successful, installing the application.

2. A method according to claim 1, wherein said installation conditions are secured by means other than said public key data or a private key corresponding to said public key.

3. A method according to claim 1, wherein, in the event that authentication of said cryptographically derived signature is unsuccessful, installation of the software application is prevented.

4. A method according to claim 1, steps 2) to 4) being performed by an antivirus service.

5. A method according to claim 4, wherein, in the event that authentication of the application code using said conditions is unsuccessful, the antivirus service performs an antivirus scan of the application code using one or both of a signature based scan or a heuristic based scan and, in the event that authentication of the application code using said conditions is successful, no such antivirus scan is performed.

6. A method according to claim 4, wherein the antivirus service detects downloading of the software application data and performs steps 2) to 4) prior to installation of the application on the end user device, the antivirus client preventing installation of the application if one of the authentication steps fails.

7. A method according to claim 4, wherein said antivirus service employs an antivirus client installed on said end user device, the antivirus client performing steps 2) to 4).

8. A method according to claim 1, steps 2) to 4) being performed by an application installer associated with a local operating system of the end user device.

9. A method according to claim 8, wherein said application installer is a component of a local operating system of the end user device.

10. A method according to claim 1, wherein step 2) comprises sending a query containing said identity or said public key, or a digest thereof, to the second remote server, and receiving from the second remote server a response containing the public key or an authentication of the public key.

11. A method according to claim 1, wherein step 2) comprises performing a lookup on a local database of the end user device.

12. A method according to claim 1, wherein said conditions comprise one or more of:
   a specification of one or more allowed filenames or filename ranges;
   a specification of one or more allowed file installation locations;
   a specification of one or more operating behaviours;
   a specification of one or more user community prevalence thresholds or patterns.

13. A method of scanning an application downloaded to an end user device for malware, the method comprising steps of:
   1) maintaining a whitelist identifying authenticated certificates and respective installation conditions;
   2) detecting a downloading of software application data to the end user device from a remote server and using this data as a trigger to determine that the application has been signed with one of said authenticated certificates; and
   3) determining whether or not code of the application satisfies the associated installation condition(s) and, if yes, then flagging the application as trusted' and installing the application, if no; then preventing installation of the application.

14. A method according to claim 13, wherein steps 1) to 3) are performed by an antivirus client installed on the end user device, optionally in cooperation with an antivirus support service provided by a remote server or server cloud.

15. A method according to claim 13, wherein steps 1) and 2) are performed by the remote server or server cloud, and optionally said step of determining whether or not code of the application satisfies the associated condition(s) is also performed by the remote server or server cloud or by a further remote server or server cloud.

16. Apparatus for authenticating or controlling a software application on an end user device, the apparatus comprising processor circuitry and a storage unit for storing instructions executable by the processor circuitry, whereby the apparatus is operative to:
   1) download software application data from a first remote server to the end user device, the data including application code, a cryptographically derived signature obtained using said application code, and an identity of an application developer;
   2) detect downloading of the software application data to the end user device and use this detection as a trigger to use said identity as a look-up key to obtain or authenticate a public key of the application data, and obtain one or more associated installation conditions from a second remote server;
   3) authenticate said cryptographically derived signature using said application code and said public key; and
   4) in the event that authentication is successful, perform a further authentication of the application code; and
   5) in the event that one of the authentications fails, prevent installation of the application, and in the event that both of the authentications are successful, install the application.

17. Apparatus controlling a software application for authenticating on an end user device, or the apparatus comprising processor circuitry and a storage unit for storing instructions executable by the processor circuitry, whereby the apparatus is operative to:
   1) maintain a whitelist identifying authenticated certificates and respective installation conditions;
   2) detect a downloading of software application data to the end user device from a remote server and use this data as a trigger to determine that the application has been signed with one of said authenticated certificates; and
   3) determine whether or not code of the application satisfies the associated installation condition(s) and, if yes, then flagging the application as trusted and install the application, if no, then prevent installation of the application.

* * * * *